United States Patent
Niitsu (10) Patent No.: US 10,797,519 B2
(45) Date of Patent: Oct. 6, 2020

(54) CONTACTLESS POWER FEEDING APPARATUS

(71) Applicant: Molex, LLC, Lisle, IL (US)

(72) Inventor: Toshihiro Niitsu, Yamato (JP)

(73) Assignee: Molex, LLC, Lisle, IL (US)

( * ) Notice: Subject to any disclaimer, the term of this patent is extended or adjusted under 35 U.S.C. 154(b) by 16 days.

(21) Appl. No.: 16/292,360

(22) Filed: Mar. 5, 2019

(65) Prior Publication Data

US 2019/0280525 A1    Sep. 12, 2019

(30) Foreign Application Priority Data

Mar. 8, 2018    (JP) .................................. 2018-041812

(51) Int. Cl.
| | | |
|---|---|---|
| *H02J 50/10* | (2016.01) | |
| *H02J 50/05* | (2016.01) | |
| *H02J 7/02* | (2016.01) | |
| *H02J 50/40* | (2016.01) | |

(52) U.S. Cl.
CPC .............. *H02J 50/10* (2016.02); *H02J 7/025* (2013.01); *H02J 50/05* (2016.02); *H02J 50/40* (2016.02)

(58) Field of Classification Search
CPC .. H02J 7/025; H02J 50/10; H02J 50/40; H02J 50/05
See application file for complete search history.

(56) References Cited

U.S. PATENT DOCUMENTS

| | | | |
|---|---|---|---|
| 2002/0132589 A1* | 9/2002 | Kojima ................... | H01F 38/18 455/73 |
| 2006/0279831 A1* | 12/2006 | McKinnell ........... | G02B 26/001 359/290 |
| 2015/0228403 A1* | 8/2015 | Zwemmer ............ | H04B 5/0037 307/104 |
| 2017/0278646 A1* | 9/2017 | Morita ............... | H01H 59/0009 |
| 2019/0252916 A1* | 8/2019 | Venkatesan ............. | G01S 17/89 |

FOREIGN PATENT DOCUMENTS

| | | |
|---|---|---|
| JP | 2015-099880 A | 5/2015 |
| JP | 5980329 B2 | 8/2016 |
| JP | 6170055 B2 | 7/2017 |

* cited by examiner

*Primary Examiner* — Jared Fureman
*Assistant Examiner* — Duc M Pham
(74) *Attorney, Agent, or Firm* — Molex, LLC (57) ABSTRACT

A contactless power feeding apparatus includes a fixed electrode device and a movable electrode device that is movable with respect to the fixed electrode device, and the fixed electrode device and the movable electrode device can exchange electric power through electric field coupling. The fixed electrode device includes at least one fixed electrode plate extending in a longitudinal direction. The movable electrode device is movable along the fixed electrode plate in the longitudinal direction, and includes at least one movable electrode unit that is movable in the thickness direction of the fixed electrode plate. The movable electrode unit includes a pair of movable electrode plates opposed to both respective side faces of the fixed electrode plate, and a spacer member that holds the distance between the pair of movable electrode plates constant and brings the pair of movable electrode plates into conduction.

7 Claims, 10 Drawing Sheets

CONTACTLESS POWER FEEDING APPARATUS

RELATED APPLICATIONS

This application claims priority to Japanese Application No. 2018-041812, filed on Mar. 8, 2018, which application is incorporated herein by reference in its entirety.

TECHNICAL FIELD

The present disclosure relates to a contactless power feeding apparatus.

BACKGROUND ART

Conventionally, power feeding apparatuses, which are referred to as contactless power feeding apparatuses or non-contact power feeding apparatuses, capable of transmitting electric power in a contactless manner without using any physical contact have been proposed (refer to Patent Document 1, for example) for various equipment such as industrial equipment, transport equipment, and home appliances to electrically interconnect mutually-moving devices to transmit electric power.

Figure 10A:
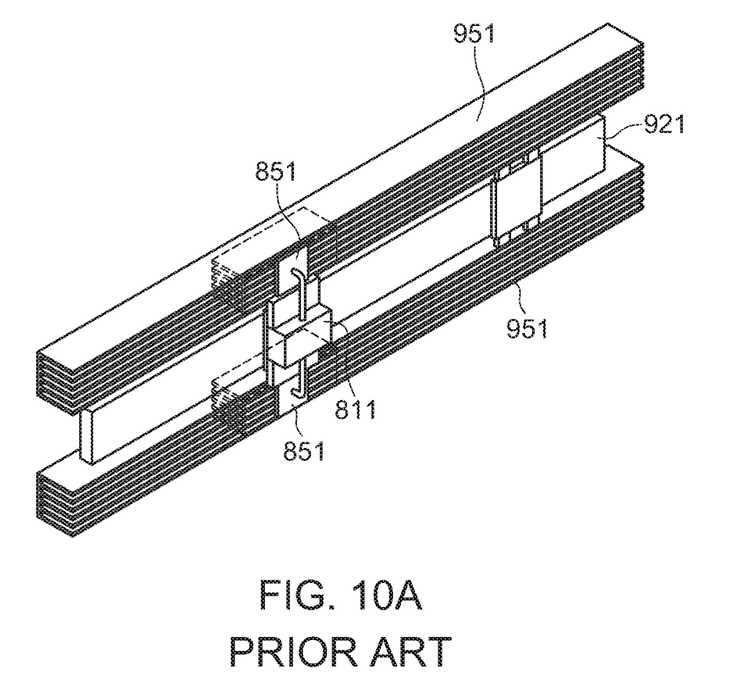
FIG. 10A is a perspective view.
Figure 10B:
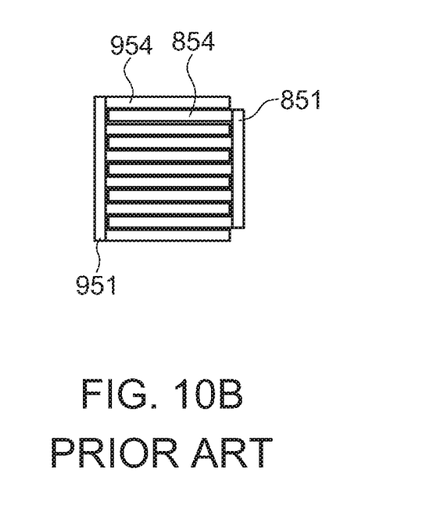
FIG. 10B is a schematic sectional view.

FIGS. 10A and 10B provide views illustrating a conventional contactless power feeding apparatus. Note that, FIG. 10A is a perspective view, while FIG. 10B is a schematic perspective view.

In the figures, reference numeral 951 denotes a pair of linearly-extending fixed electrodes disposed to be parallel to each other. Reference numeral 921 denotes a linearly-extending guide beam disposed between the pair of fixed electrodes 951 and in parallel with the fixed electrodes 951. The fixed electrodes 951 and the guide beam 921 are fixed to a main body of an operating device that is not illustrated.

Reference numeral 851 denotes a pair of movable electrodes that are slidable along the respective fixed electrodes 951. Reference numeral 811 denotes a movable head that is slidable along the guide beam 921, and couples the movable electrodes 851 to each other. A working head of the operating device that is not illustrated is attached to the movable head 811. Electric power is fed from the main body to the working head through the fixed electrodes 951 and the movable electrodes 851 using an electric field coupling method.

As illustrated in FIG. 10B, the fixed electrodes 951 each have a plurality of comb-like fixed electrode plates 954. The fixed electrode plates 954 are linearly-extending oblong band-like flat plates disposed to be parallel to each other with a predetermined distance therebetween. The movable electrodes 851 each have a plurality of comb-like movable electrode plates 854. The movable electrode plates 854 are rectangular flat plates disposed to be parallel to each other with a predetermined distance therebetween. The fixed electrodes 951 and the movable electrodes 851 are combined such that the fixed electrode plate 954 and the movable electrode plate 854 are alternately disposed, that is, the movable electrode plate 854 is inserted between the adjacent fixed electrode plates 954.

In the combined state, a minute gap is present between the fixed electrode plate 954 and the movable electrode plate 854, such that the fixed electrode plate 954 is not in contact with the movable electrode plate 854. Since the movable head 811 slides along the guide beam 921 via a linear guide not illustrated, even when the movable electrode 851 slides along the fixed electrode 951, the minute gap between the fixed electrode plate 954 and the movable electrode plate 854 is maintained such that the non-contact state between the fixed electrode plate 954 and the movable electrode plate 854 is maintained. Further, since the opposed faces of the fixed electrode plates 954 and the movable electrode plates 854 each have a large area, the electrode area that functions through electric field coupling becomes large, enabling a large amount of electric power to be fed.

Patent Document 1: Japanese Unexamined Patent Application Publication No. 2015-099880.

SUMMARY

However, with a conventional contactless power feeding apparatus, in order to maintain the non-contact state between the fixed electrode plates 954 and the movable electrode plates 854, the movable head 811 is slid along the guide beam 921 via the linear guide. For this reason, the entirety of the contactless power feeding apparatus becomes larger and more complicated, resulting in an increase in costs. In order to maintain the non-contact state between the fixed electrode plates 954 and the movable electrode plates 854, the parallelism of the fixed electrode plates 954 and the guide beam 921 needs to be strictly maintained. In particular, when the sliding distance of the movable head 811 becomes large, high dimensional accuracy and high installation accuracy are required for the fixed electrode plates 954, resulting in an increase in costs.

An object of the present disclosure is to provide a highly reliable contactless power feeding apparatus that solves the above-mentioned problem of the conventional contactless power feeding apparatus, has a simple structure, can be easily produced at a low cost, and can stably feed a large amount of electric power by configuring each of the movable electrode units to be movable laterally.

Thus, a contactless power feeding apparatus of the present disclosure includes a fixed electrode device and a movable electrode device that is movable with respect to the fixed electrode device, and the fixed electrode device and the movable electrode device can exchange electric power through electric field coupling. The fixed electrode device includes at least one fixed electrode plate extending in a longitudinal direction. The movable electrode device is movable along the fixed electrode plate in the longitudinal direction, and includes at least one movable electrode unit that is movable in a thickness direction of the fixed electrode plate. The movable electrode unit includes a pair of movable electrode plates opposed to both respective side faces of the fixed electrode plate, and a spacer member that holds the distance between the pair of movable electrode plates constant and brings the pair of movable electrode plates into conduction.

In another contactless power feeding apparatus, at least both side faces of the fixed electrode plate are coated with a coating film formed of a dielectric.

In still another contactless power feeding apparatus, the spacer member and the pair of movable electrode plates are integrated into a single member.

In still another contactless power feeding apparatus, the fixed electrode device includes a plurality of the fixed electrode plates disposed in parallel to each other and in parallel in the plate thickness direction thereof, the movable electrode device includes a plurality of the movable electrode units disposed in parallel in the plate thickness direction of the fixed electrode plates, and the movable electrode units are independently movable in the plate thickness direction of the fixed electrode plates.

In still another contactless power feeding apparatus, an elastic conductive member is disposed between the adjacent movable electrode units, the elastic conductive member being capable of expanding and contracting in the plate thickness direction of the fixed electrode plates and bringing the adjacent movable electrode units into conduction.

In still another contactless power feeding apparatus, each of the plurality of the movable electrode units is movably fitted to a unit connecting member extending in the thickness direction of the fixed electrode plates.

In still another contactless power feeding apparatus, the movable electrode device includes a connecting block having a plurality of holding grooves disposed in parallel in the plate thickness direction of the fixed electrode plates, and the plurality of the movable electrode units are movably fitted to the respective holding grooves and held in the respective holding grooves.

According to the present disclosure, in the contactless power feeding apparatus, the movable electrode units are independently movable in the lateral direction. Therefore, a more reliable contactless power feeding apparatus capable of stably feeding a large amount of electric power can be easily produced with a simple configuration at a low cost.

BRIEF DESCRIPTION OF DRAWINGS

FIGS. 10A and 10B are views of a conventional contactless power feeding apparatus.

DETAILED DESCRIPTION OF THE PREFERRED EMBODIMENTS

Embodiments will be described in detail below with reference to drawings.

Figure 1:
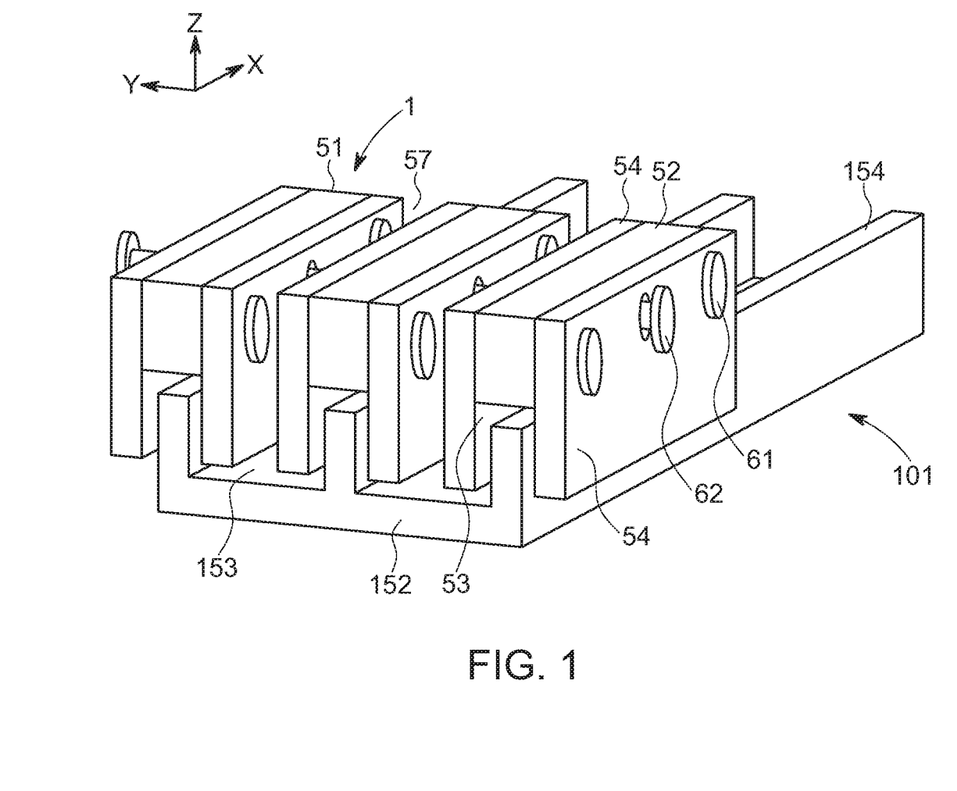
FIG. 1 is a perspective view of a contactless power feeding apparatus in accordance with a first embodiment.
Figure 2:
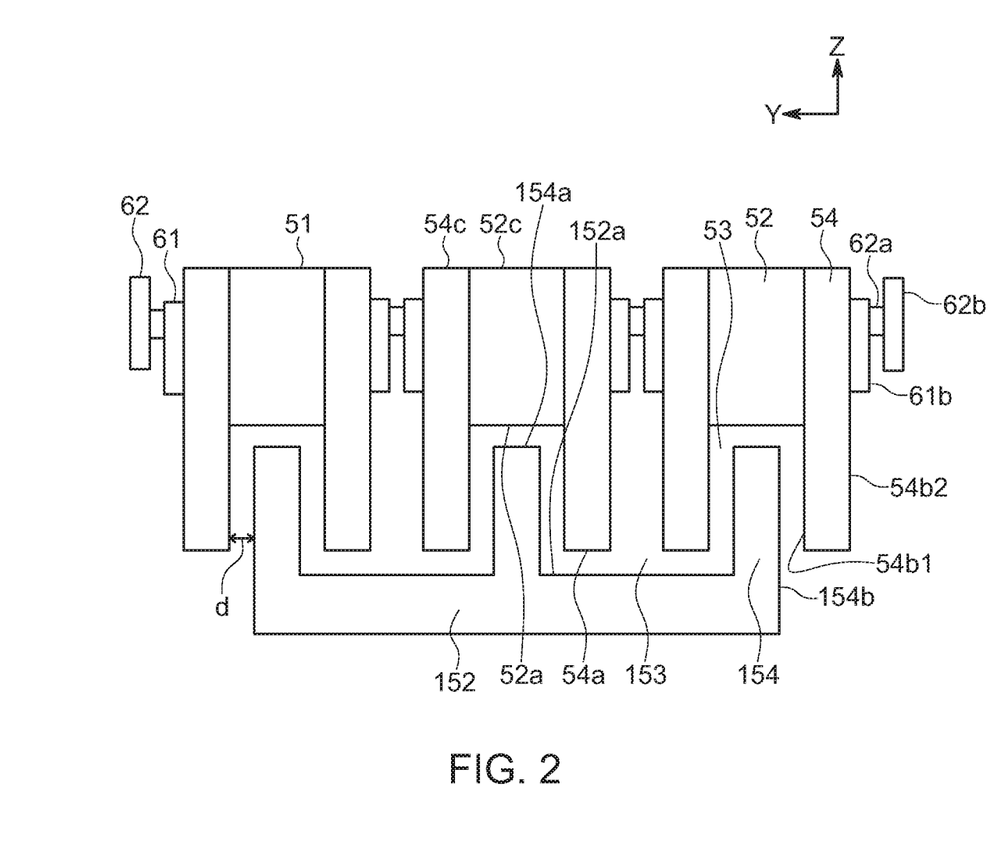
FIG. 2 is a front view of the contactless power feeding apparatus in accordance with the first embodiment.
Figure 3:
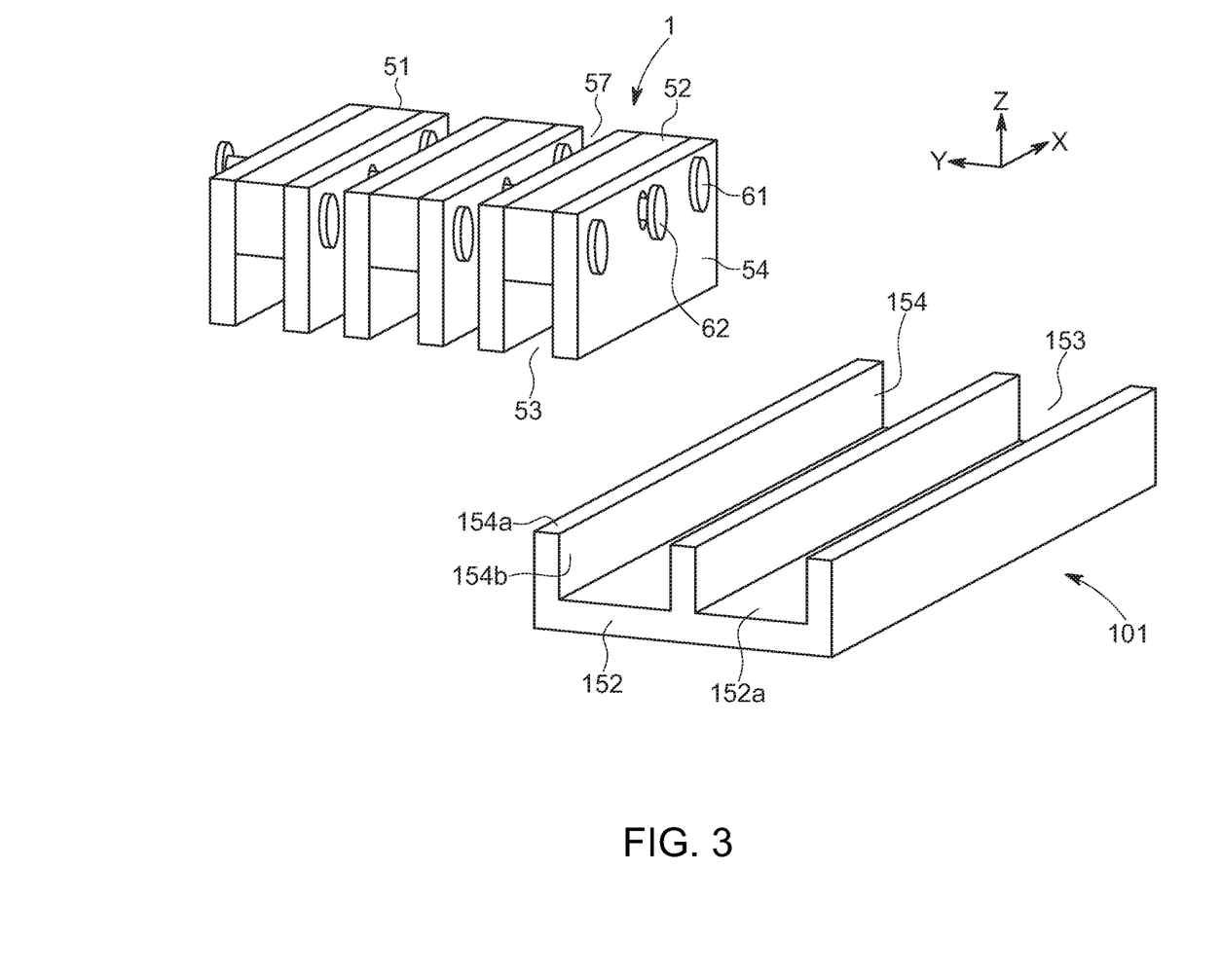
FIG. 3 is a perspective view illustrating a state where a trolley and a rail in the contactless power feeding apparatus in accordance with the first embodiment are separated from each other.
Figure 4:
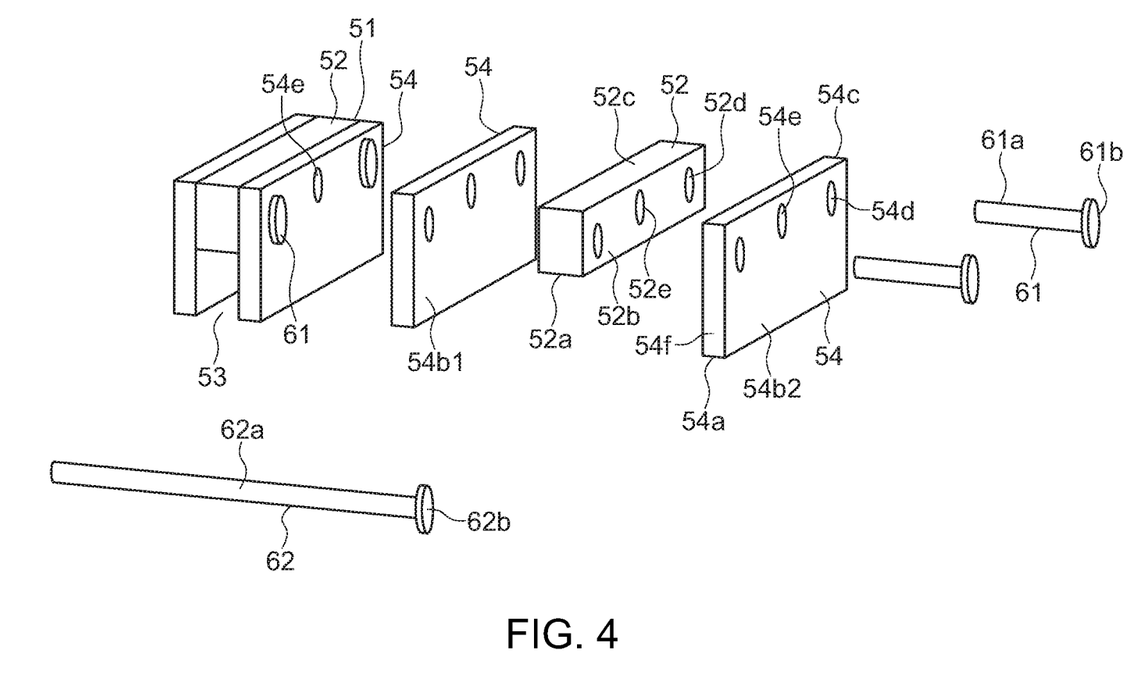
FIG. 4 is a partial exploded view of the trolley of the contactless power feeding apparatus in accordance with the first embodiment.
Figure 5:
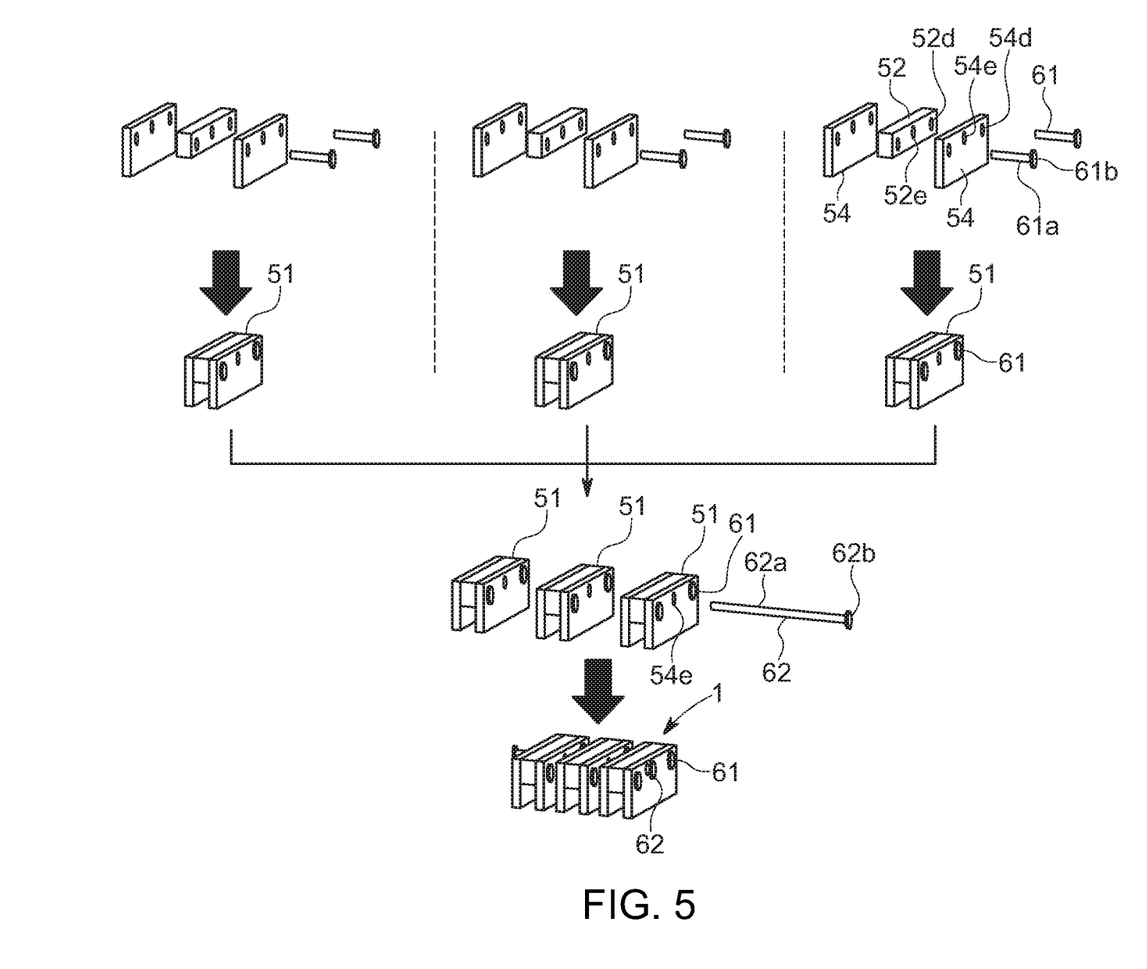
FIG. 5 is a view illustrating an assembly process of the trolley of the contactless power feeding apparatus in accordance with the first embodiment.
Figure 6:
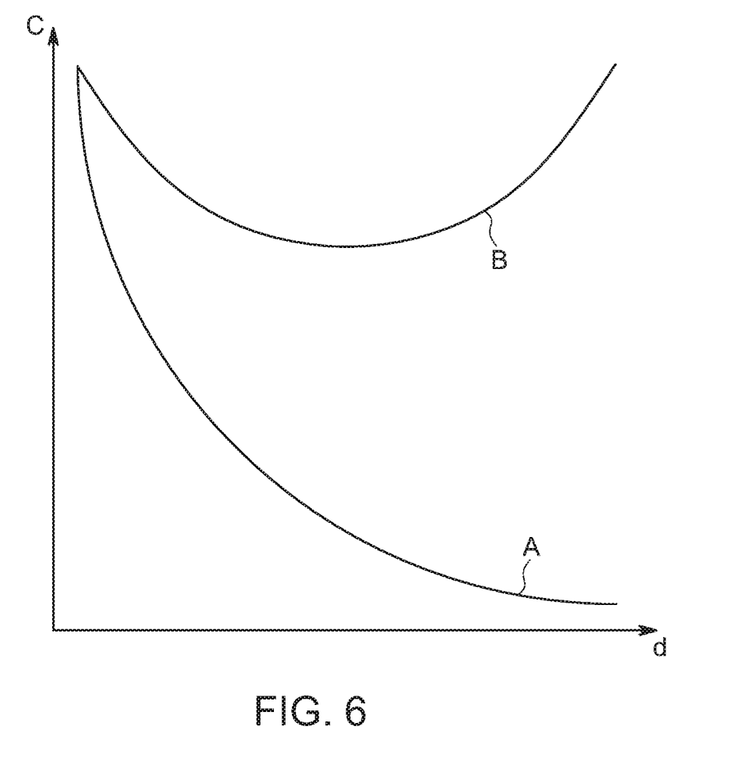
FIG. 6 is a view illustrating the relation between the capacitance and the electrode interval of the contactless power feeding apparatus in accordance with the first embodiment.

FIG. 1 is a perspective view of a contactless power feeding apparatus in accordance with a first embodiment, FIG. 2 is a front view of the contactless power feeding apparatus in accordance with the first embodiment, FIG. 3 is a perspective view illustrating a state where a trolley and a rail in the contactless power feeding apparatus in accordance with the first embodiment are separated from each other, FIG. 4 is a partial exploded view of the trolley of the contactless power feeding apparatus according to the first embodiment, FIG. 5 is a view illustrating an assembly process of the trolley of the contactless power feeding apparatus in accordance with the first embodiment, and FIG. 6 is a view illustrating the relation between the capacitance and the electrode interval of the contactless power feeding apparatus in accordance with the first embodiment.

In the drawings, reference numeral 1 denotes a trolley that is a movable electrode device in the present embodiment. As illustrated in FIGS. 1 and 2, the trolley is slidably combined with a rail 101, which is a fixed electrode device in this embodiment, while maintaining a non-contact state with the rail 101, to transmit electric power between the trolley 1 and the rail 101. The trolley 1 and the rail 101 constitute the contactless power feeding apparatus of the present embodiment. The contactless power feeding apparatus can be used to form a power line for connecting a power source to power-consuming equipment in various equipment such as industrial equipment, transport equipment, and home appliances, and specifically, an alternating current (AC current) is fed in the non-contact manner through electric field coupling.

Any of the trolley 1 and the rail 101 may be connected to the power source, and any of the trolley 1 and the rail 101 may be connected to the power-consuming equipment. For convenience, in the present embodiment, it is assumed that the trolley 1 is connected to the power-consuming equipment and the rail 101 is connected to the power source, that is, the trolley 1 is on the power consumption side and the rail 101 is on the power source side.

Furthermore, expressions for indicating directions such as up, down, left, right, front, and back, used to describe the operations and configurations of the parts of the trolley 1 and the rail 101 in the present embodiment are not absolute but rather relative directions, and though appropriate when the parts of the trolley 1 and the rail 101 are in the positions illustrated in the figures, these directions should be interpreted to correspond to changes when these positions are changed.

In the present embodiment, it is assumed that the rail 101 is an oblong member linearly extending in the longitudinal direction (X-axis direction), and is fixed to a main body of various equipment such as industrial equipment, transport equipment, and home appliances. Further, it is assumed that the rail is electrically connected to the power source through a conductive line, which is not illustrated. The rail 101 is not specifically limited, but is a long member. For convenience of illustration, however, in the example illustrated in FIGS. 1 and 2, the dimension in the longitudinal direction is relatively short.

The rail 101 includes an oblong band-like substrate 152 linearly extending in the longitudinal direction (X-axis direction), and guide plates 154 that are oblong band-like fixed electrode plates extending perpendicularly upward (positive Z-axis direction) from an upper face 152a of the substrate 152 and extending linearly in the longitudinal direction. The substrate 152 and the guide plates 154 are, for example, members made of a conductive metal such as an aluminum alloy, but may be made of any type of conductive material. The number of the guide plates 154 may be any number, and for example, may be one, two, or four or more. Here, for convenience, the number of the guide plates 154 is three as illustrated in FIGS. 1 and 2. All of the guide plates 154 are configured to be mutually conductive. Further, the substrate 152 and the guide plates 154 are separately-manufactured members, and may be interconnected physically and electrically using connecting members such as bolts. Here, as illustrated in FIGS. 1 and 2, they are integrated into a single member.

When viewed from the front or back (viewed in the X-axis longitudinal direction), the guide plates 154 are disposed in a comb-like manner, and linearly extend upward from the upper face 152a of the substrate 152, parallel to each other. When viewed from above or below (viewed in the Z-axis longitudinal direction), the guide plates 154 linearly extend in the longitudinal direction (X-axis direction), parallel to each other. Accordingly, upper faces 154a of the respective guide plates 154 are parallel to the upper face 152a of the substrate 152, and are flush with each other. Side faces 154b of the respective guide plates 154 are flat faces that are perpendicular to the upper face 152a of the substrate 152, and are parallel to each other. Further, the guide plates 154 have the same outer shape and dimensions (height, width, and length). Guide grooves 153 each formed between the adjacent guide plates 154 have the same outer shape and dimensions (height, width, and length).

A coating film made of an insulating material (dielectric) is formed on each of the faces of the parts of the rail 101, which are opposed to the respective parts of the trolley 1, that is, at least the upper face 152a of the substrate 152 as well as the upper faces 154a and the side faces 154b of the guide plates 154 on the surface of the rail 101. For example, if the substrate 152 and the guide plates 154 are made of an aluminum alloy, the coating film is preferably a coating film made of anodized aluminum. Thus, even if a part of the trolley 1 makes contact with the surface of the rail 101, conduction between the trolley 1 and the rail 101 can be avoided.

In the present embodiment, as illustrated in FIGS. 1 and 2, the trolley 1 is a member that is slidable along the rail 101 in a state of being combined with the rail 101. In various types of equipment such as industrial equipment, transport equipment, and home appliances, the trolley 1 is assumed to be fixed to a sliding member (not illustrated) that is slidable on the main body. Thus, as illustrated in FIGS. 1 and 2, the trolley 1 can slide in the longitudinal direction (X-axis direction) of the rail 101 in the state of being combined with the rail 101, which is fixed to the main body. In addition, the trolley is assumed to be electrically connected to power-consuming equipment such as a motor and lighting through a conductive line not illustrated.

The trolley 1 includes a plurality of movable electrode units 51. The movable electrode units 51 correspond to the respective guide plates 154 of the rail 101, and transmit electric power to the respective guide plates 154 by electric field coupling. The number of the movable electrode units 51 included in the trolley 1 may be any number such as one, two, or four or more. Here, for convenience, the number of the movable electrode units 51 is three, which corresponds to the number of the guide plates 154 illustrated in FIGS. 1 and 2. The movable electrode units 51 are interconnected physically and electrically using a long rivet 62 that is a unit connecting member made of a conductive metal. However, the movable electrode units 51 are interconnected with a small gap 57 therebetween so as to be movable in the plate thickness direction of the guide plates 154, that is, the lateral direction (Y-axis direction) in a floating state.

The movable electrode units 51 each include a spacer member 52 and plate-like sliding plates 54, which are a pair of movable electrode plates disposed on both sides of the spacer member 52 in the lateral direction. The spacer member 52 and the sliding plates 54 are members made of a conductive metal such as aluminum alloy, but may be made of any type of conductive material. The pair of sliding plates 54 are mutually conducting via the spacer member 52. The spacer member 52 is connected to the pair of sliding plates 54 physically and electrically using short rivets 61 that are sliding-plate connecting members made of a conductive metal. The spacer member 52 and the pair of sliding plates 54 are physically and firmly interconnected so as to be unmovable with respect to each other.

Specifically, the spacer member 52 is provided with one long-rivet through hole 52e and two short-rivet through holes 52d, which penetrate the spacer member 52 in the thickness direction, that is, the lateral direction. Each of the sliding plates 54 is provided with one long-rivet through hole 54e and two short-rivet through holes 54d, which penetrate the sliding plate 54 in the thickness direction, that is, the lateral direction. The long-rivet through hole 52e and the short-rivet through holes 52d of the spacer member 52 are formed at positions that correspond mutually with the long-rivet through hole 54e and the short-rivet through holes 54d of the sliding plate 54.

As illustrated in FIG. 5, inner side faces 54b1 of the sliding plates 54 are brought into contact with side faces 54b on the both sides of the spacer member 52 in the lateral direction, the short-rivet through holes 52d of the spacer member 52 are aligned with the short-rivet through holes 54d of the sliding plates 54, and shaft members 61a of the short rivets 61 are inserted into the respective short-rivet through holes 52d of the spacer member 52 and the respective short-rivet through holes 54d of the sliding plates 54. Then, ends of the shaft members 61a of the short rivets 61 each may be plastically deformed to form a head portion 61b having a larger diameter than that of the shaft member 61a, thereby fastening the spacer member 52 to the pair of sliding plates 54. The head portions 61b may be replaced with nuts. Besides nuts, any means capable of preventing the shaft members 61a from escaping may be used. Through this, a movable electrode unit 51 in which the spacer member 52 is reliably connected to the pair of sliding plates 54 physically and electrically can be obtained.

When viewed from the front or back (viewed in the X-axis longitudinal direction), each of the movable electrode units 51 is gate-shaped or U-shaped, and the pair of sliding plates 54 extends linearly downward (Z-axis negative direction) from respective both lateral ends of a lower face 52a of the spacer member 52 to be parallel to each other. When viewed from above or below (viewed in the Z-axis longitudinal direction), the sliding plates 54 linearly extend in the longitudinal direction (X-axis direction) to be parallel to each other. Accordingly, the lower face 54a of each sliding plate 54 is parallel to the lower face 52a of the spacer member 52. An upper face 54c of each sliding plate 54 is flush with an upper face 52c of the spacer member 52, but may not be flush with the upper face 52c. The inner side faces 54b1 of the sliding plates 54 are flat faces that are perpendicular to the lower face 52a of the spacer member 52 and are parallel to each other. Further, an outer side face 54b2 of each sliding plate 54 is desirably parallel to the inner side face 54b1. The inner side face 54b1 and the outer side face 54b2 of the sliding plate 54 may be collectively described as the side faces 54b of the sliding plate 54. Further, the sliding plates 54 have substantially the same outer shape and dimensions (height, width, and length). A sliding groove 53 is formed between the opposed sliding plates 54. The outer shape and dimensions (height, width, and length) of each part of each movable electrode unit 51 are substantially the same.

Further, as illustrated in FIG. 5, the plurality of (three in the illustrated example) movable electrode units 51 are disposed in parallel, the long-rivet through holes 52e of the movable electrode units 51 are aligned with each other, and a shaft member 62a of the long rivet 62 is inserted into the long-rivet through holes 54e of all of the movable electrode units 51. At this time, the shaft member 62a is loosely fitted (movably fitted) into the long-rivet through holes 54e. Then, an end of the shaft member 62a of the long rivet 62 is plastically deformed to form a head portion 62b having a larger diameter than that of the shaft member 62a, thereby coupling all of the movable electrode units 51 together. The head portion 62b may be replaced with a nut. Besides the nut, any means capable of preventing the movable electrode units 51 from escaping may be used. Accordingly, all of the movable electrode units 51 can slide together in the longitudinal direction of the rail 101. At this time, the small gap 57 is present between the adjacent movable electrode units 51, and thus the movable electrode units 51 are loosely coupled to one another while being loosely fitted to the long rivet 62 so as to be independently movable in the lateral direction. Through this, the trolley 1 can be obtained.

In the case where all of the movable electrode units 51 are to be reliably electrically-interconnected, the movable electrode units 51 may be connected to respective ends of three conductive lines having the other ends connected to power-consuming equipment, or any one of the movable electrode units 51 may be connected to one end of one conductive line that has the other end connected to power-consuming equipment. In the case where the movable electrode units 51 are not required to be reliably electrically-interconnected, each of the movable electrode units 51 is preferably connected to a respective end of the three conductive lines having the other ends connected to power-consuming equipment.

In the state where the trolley 1 is combined with the rail 101, the parts of the trolley 1 are not in contact with the parts of the rail 101. Specifically, as illustrated in FIG. 1 and FIG. 2, each of the movable electrode units 51 of the trolley 1 straddles the corresponding guide plates 154 of the rail 101, and the corresponding guide plates 154 enter the sliding grooves 53 of the movable electrode unit 51 in the non-contact state. In addition, the sliding plates 54 of the corresponding movable electrode units 51 enter into each guide groove 153 of the rail 101 in the non-contact state. That is, a gap is present between the inner side face 54b1 of the sliding plate 54 and the side face 154b of the guide plate 154, which are opposed to each other, a gap is present between the lower face 52a of the spacer member 52 and the upper face 154a of the guide plate 154, which are opposed to each other, and a gap is present between the lower face 54a of the sliding plate 54 and the upper face 152a of the substrate 152, which are opposed to each other. Like the surface of the rail 101, the surfaces of the parts of each movable electrode unit 51, which are opposed to the parts of the rail 101, may be coated with a coating film made of an insulating material (dielectric).

As described above, when an AC current is fed to the rail 101 in the state where the trolley 1 is combined with the rail 101, electric power is fed to the trolley 1 by electric field coupling. Specifically, the side face 154b of the guide plate 154 and the inner side face 54b1 of the sliding plate 54 are opposed to each other with a large surface area of the opposing faces and therefore, function as main electrode faces. More specifically, when viewed in the lateral direction (Y-axis longitudinal direction), overlapping portions of the side face 154b of the guide plate 154 and the inner side face 54b1 of the sliding plate 54 on each side of the guide plate 154 function as electrode faces by electric field coupling. The mutually opposed faces of the parts of the rail 101 and the parts of the trolley 1 can also function as electrode faces by electric field coupling, but have a smaller area and are less functional as the electrode faces than the opposed faces of the side face 154b of the guide plate 154 and the inner side face 54b1 of the sliding plate 54. Thus, only the opposed faces of the side face 154b of the guide plate 154 and the inner side face 54b1 of the sliding plate 54 are described, and description of the function of the other opposed faces as the electrode faces is omitted.

Here, as illustrated in FIG. 2, when the gap between the side face 154b of the guide plate 154 and the inner side face 54b1 of the sliding plate 54 opposed to the side face 154b, that is, the electrode gap, is denoted as d, a capacitance C between the side faces 154b and the inner side face 54b1 that are the electrode faces is generally expressed by the following equation (1).

$$C=\varepsilon(S/d).\qquad\text{Equation (1)}$$

Here, ε denotes permittivity of the electrode gap, and S denotes the electrode area.

According to equation (1), the relation between the capacitance C and the electrode gap d changes as indicated by a line A in FIG. 6. Thus, since the capacitance C lowers as the electrode gap d increases, in order to cause the side face 154b of the guide plate 154 and the inner side face 54b1 of the sliding plate 54 opposed to the side face 154b to efficiently function as the electrode faces, the electrode gap d must be maintained at a small value. In the case where the electrode gaps d between the side faces 154b of the guide plate 154 on both sides in the lateral direction, and the opposed side faces 54b1 of the sliding plates 54 are equal to each other, the value of the electrode gap d is preferably 10 [μm] or less, and more preferably 5 [μm] or less.

In the present embodiment, each movable electrode unit 51 straddles the guide plate 154 such that the inner side face 54b1 of each of the sliding plates 54 is opposed to each of the side faces 154b of the guide plate 154 on both sides in the lateral direction. Accordingly, when the electrode gap d between one side face 154b of the guide plate 154 and the inner side face 54b1 of the sliding plate 54, which are opposed to each other, changes in the plate thickness direction of the guide plates 154, the electrode gap d between the other side face 154b of the guide plate 154 and the inner side face 54b1 of the sliding plate 54, which are opposed to each other, changes in the opposite direction. That is, when the electrode gap d between one side face 154b of the guide plate 154 and the inner side face 54b1 of the sliding plate 54, which are opposed to each other, increases, the electrode gap d between the other side face 154b of the guide plate 154 and the inner side face 54b1 of the sliding plate 54, which are opposed to each other, decreases. Conversely, when the electrode gap d between one side face 154b of the guide plate 154 and the inner side face 54b1 of the sliding plate 54, which are opposed to each other, decreases, the electrode gap d between the other side face 154b of the guide plate 154 and the inner side face 54b1 of the sliding plate 54, which are opposed to each other, increases. As a result, the capacitance C between both side faces 154b of the guide plate 154 and the inner side faces 54b1 of the pair of sliding plates 54, which are opposed to each other, changes, as represented by a line B in FIG. 6, in response to a change in the electrode gap d between one side face 154b of the guide plate 154 and the inner side face 54b1 of the sliding plate 54, which are opposed to each other. That is, even when the electrode gap d between one side face 154b of the guide plate 154 and the inner side face 54b1 of the sliding plate 54, which are opposed to each other, changes, the capacitance C between the both side faces 154b of the guide plate 154 and the inner side faces 54*b*1 of the pair of sliding plates 54, which are opposed to each other, is maintained at a practical and sufficiently large value at all times without greatly decreasing. The value of the gap 57 between the adjacent movable electrode units 51 is desirably set to the electrode gap d or more such that each movable electrode unit 51 is freely movable in the lateral direction.

As described above, in this embodiment, since each movable electrode unit 51 straddles the guide plate 154, and the inner side faces 54*b*1 of the pair of sliding plates 54 are opposed to the side faces 154*b* of the guide plate 154 on both sides in the lateral direction, even when each movable electrode unit 51 moves in the plate thickness direction of the guide plate 154, that is, the lateral direction, to change the electrode gap d between one side face 154*b* of the guide plate 154 and the inner side face 54*b*1 of the sliding plate 54, which are opposed to each other, the capacitance C between the pair of movable electrode units 51 and the guide plate 154 does not greatly decreases. Moreover, since the electrode area S is doubled for case in which the sliding plate 54 is disposed on only one side face 154*b* of the guide plate 154, a sufficiently large capacitance C can be maintained at all times. Accordingly, even when each of the movable electrode units 51 is floating in a movable manner in the lateral direction, a sufficiently large capacitance C can be maintained at all times.

Since at least the faces of the rail 101, which are opposed to the parts of the movable electrode units 51, are coated with the coating film made of an insulating material (dielectric), even when the movable electrode unit 51 largely moves in the lateral direction to bring the inner side face 54*b*1 of the sliding plate 54 into contact with the side face 154*b* of the guide plate 154, electric continuity between the sliding plate 54 and the guide plate 154 never occurs. Consequently, the inner side face 54*b*1 of the sliding plate 54 and the side face 154*b* of the guide plate 154 still function as electrode faces through electric field coupling via the dielectric.

Further, since each of the movable electrode units 51 is floating in a movable manner in the lateral direction, it is not necessary to strictly position each movable electrode unit 51 with respect to the rail 101 in the lateral direction. Therefore, unlike the conventional contactless power feeding apparatus described in the "Background Art" section, an expensive linear guide is unnecessary, and thus costs can be reduced. When the rail 101 is extremely long in particular, it is actually difficult to make the side face 154*b* of the guide plate 154 completely flat over the entire length. Thus, the side face 154*b* of the guide plate 154 undergoes a small displacement in the lateral direction. Even in such case, each of the movable electrode units 51 is floating in a movable manner in the lateral direction, and thus can address the displacement of the side face 154*b* of the guide plate 154 in the lateral direction.

While the trolley 1 slides along the rail 101, even when the movable electrode unit 51 moves in the lateral direction to bring the inner side face 54*b*1 of the sliding plate 54 into contact with the side face 154*b* of the guide plate 154, the sliding plate 54 moves in the opposite direction due to a reaction force from the guide plates 154. Therefore, the trolley 1 does not continue to slide while maintaining contact between the inner side face 54*b*1 of the sliding plate 54 and the side face 154*b* of the guide plate 154. That is, the inner side face 54*b*1 of the sliding plate 54 is not in sliding-contact with the side face 154*b* of the guide plate 154 over a long distance. Accordingly, the coating film made of the insulating material is not worn by the sliding-contact between the inner side face 54*b*1 of the sliding plate 54 and the side face 154*b* of the guide plate 154.

As described above, in this embodiment, the contactless power feeding apparatus includes the rail 101 and the trolley 1 that is movable with respect to the rail 101, and can transmit electric power between the rail 101 and the trolley 1 by electric field coupling. The rail 101 includes at least one guide plate 154 extending in the longitudinal direction, the trolley 1 is movable along the guide plate 154 in the longitudinal direction and includes at least one movable electrode unit 51 that is movable in the plate thickness direction of the guide plate 154, and the movable electrode unit 51 includes the pair of sliding plates 54 opposed to both respective side faces of the guide plate 154, and the spacer member 52 that holds the distance between the pair of sliding plates 54 constant and brings the pair of sliding plates 54 into conduction.

In this manner, even when one sliding plate 54 moves in the plate thickness direction of the guide plate 154 to change the gap between the sliding plate and the guide plate 154, the other sliding plate 54 moves in the opposite direction to conversely change the gap between the sliding plate and the guide plate 154, thereby preventing a significant decrease in the capacitance C between the pair of movable electrode units 51 and the guide plate 154. Moreover, since the electrode area S is doubled in the case where the sliding plate 54 is disposed on only one of the guide plates 154, a sufficiently large capacitance C can be maintained at all times. Therefore, a highly-reliable contactless power feeding apparatus capable of stably feeding a large amount of electric power can be easily produced with simple configuration at a low cost.

At least both side faces of the guide plates 154 are coated with the coating film formed of the dielectric. Accordingly, even when the movable electrode units 51 move significantly in the lateral direction to bring the sliding plate 54 into contact with the guide plate 154, electric continuity between the sliding plate 54 and the guide plate 154 never occurs, and thus the sliding plate 54 and the guide plates 154 can maintain function as electrodes by electric field coupling via the dielectric.

Further, the rail 101 includes the plurality of guide plates 154 that are disposed in parallel to each other and in parallel in the plate thickness direction of the guide plates, the trolley 1 includes the plurality of movable electrode units 51 disposed in parallel in the plate thickness direction of the guide plates 154, and the movable electrode units 51 are independently movable in the plate thickness direction of the guide plates 154. This can increase the area of the electrodes, making it possible to feed a larger amount of electric power.

Further, each of the plurality of movable electrode units 51 is movably fitted to the long rivet 62 extending in the plate thickness direction of the guide plates 154. Therefore, the movable electrode units 51 are independently movable in the plate thickness direction of the guide plates 154.

Next a second embodiment will be described. Note that the description of elements having the same structures as those of the first embodiment will be omitted by being denoted by the same reference numerals. Furthermore, the description of operations and effects that are the same as those of the first embodiment will be omitted.

Figure 7:
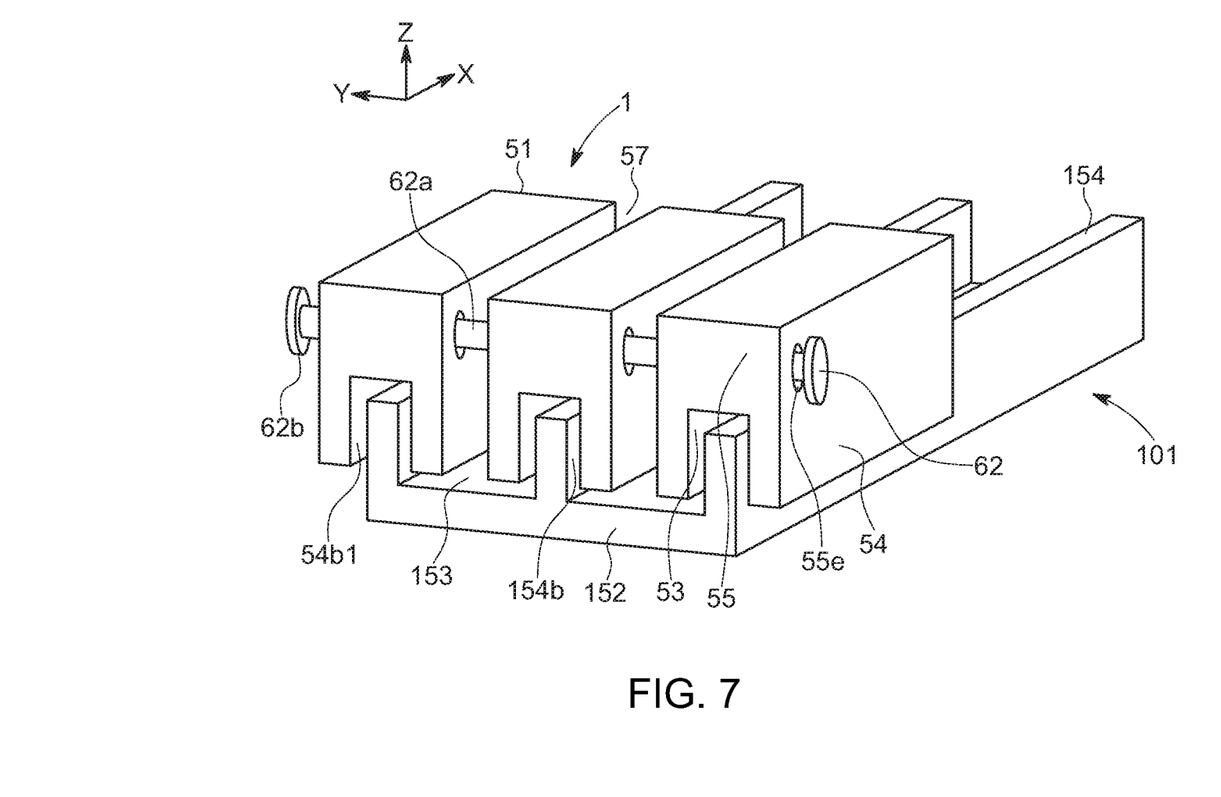
FIG. 7 is a perspective view of a contactless power feeding apparatus in accordance with a second embodiment.

FIG. 7 is a perspective view of a contactless power feeding apparatus in accordance with a second embodiment.

Note, since a rail 101 in this embodiment is the same as the rail 101 in the first embodiment, the description thereof is omitted.

In this embodiment, each of the movable electrode units 51 included in the trolley 1 is configured such that the spacer member 52 and the sliding plates 54 are integrated into a single member. Specifically, the spacer member 52 and upper portions of the sliding plates 54 on both sides of the spacer member 52 are integrated into a sliding-plate combining body 55. The sliding-plate combining body 55 has a long-rivet through hole 55*e*. The short rivet 61, the short-rivet through holes 52*d* and the long-rivet through hole 52*e* of the spacer member 52, and the short-rivet through holes 54*d* and the long-rivet through hole 54*e* of the sliding plate 54 are omitted.

The plurality of (three in the illustrated example) movable electrode units 51 are disposed in parallel, the long-rivet through holes 52*e* of the movable electrode units 51 are aligned with one another, and the shaft member 62*a* of the long rivet 62 is inserted into the long-rivet through holes 55*e* of all of the movable electrode units 51. Then, the end of the shaft member 62*a* of the long rivet 62 is plastically deformed to form the head portion 62*b* having a larger diameter than that of the shaft member 62*a*, thereby coupling all of the movable electrode units 51 together. Accordingly, all of the movable electrode units 51 are slidable in the longitudinal direction of the rail 101. At this time, the gap 57 is present between the adjacent movable electrode units 51, and all of the movable electrode units 51 are loosely coupled together so as to be independently movable in the lateral direction. Through this, the trolley 1 can be obtained.

Note, since the other configurations, operations, and effects are the same as those in the first embodiment, the description thereof is omitted.

As described above, in this embodiment, the spacer member 52 and the pair of sliding plates 54 are integrated into a single member. Accordingly, the movable electrode units 51 can be easily manufactured with a high level of precision.

Next, a third embodiment will be described. It should be noted that the description of elements having the same structure as the first and second embodiments will be omitted by denoting said elements by the same reference numerals. Furthermore, descriptions of operations and effects that are the same as those of the first and second embodiments will also be omitted.

Figure 8:
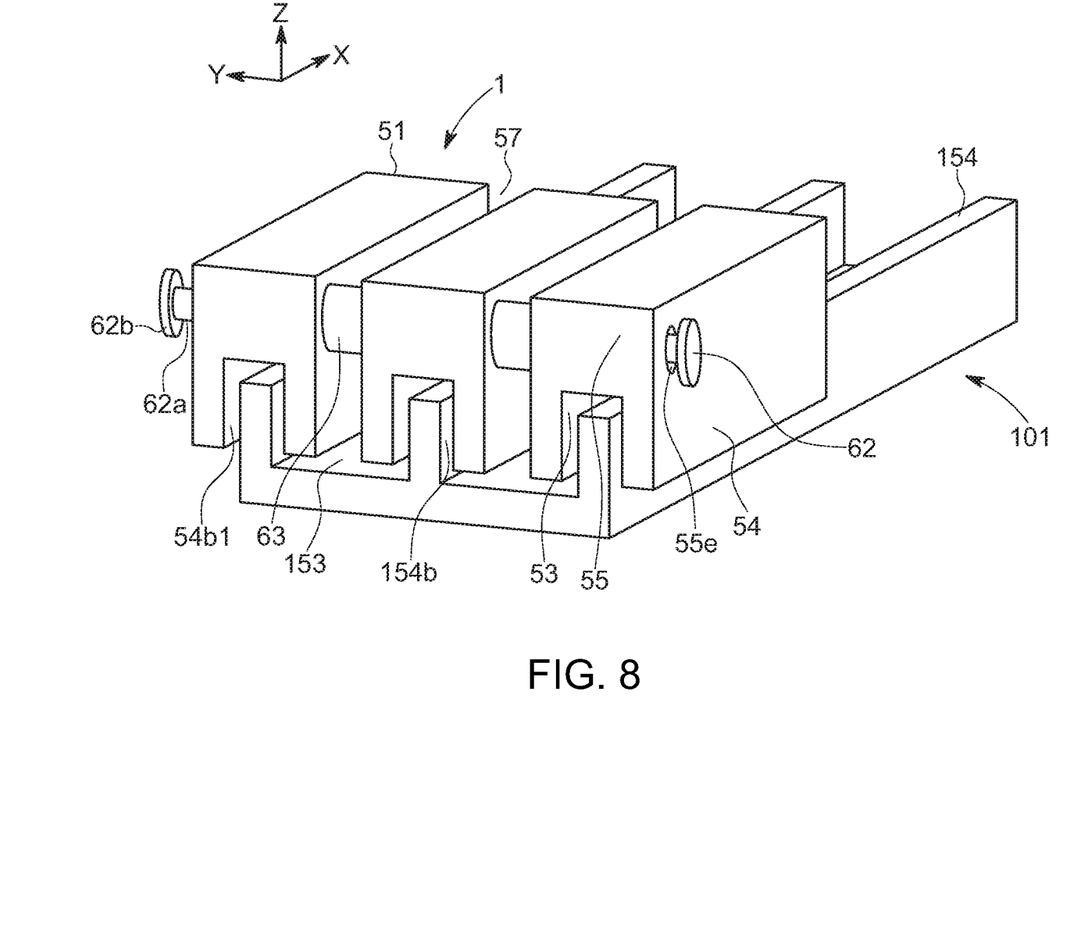
FIG. 8 is a perspective view of a contactless power feeding apparatus in accordance with a third embodiment.

FIG. 8 is a perspective view of a contactless feeding apparatus in accordance with a third embodiment.

Note, since a rail 101 in this embodiment is the same as the rail in the first and second embodiments, the description thereof is omitted.

Since each movable electrode unit 51 in the trolley 1 in this embodiment is the same as the movable electrode unit 51 in the second embodiment, a description thereof is omitted.

In this embodiment, an elastic conductive member 63, which is an electric unit connecting member for bringing adjacent movable electrode units 51 into conduction, is attached to the long rivet 62, which is the unit connecting member for connecting the movable electrode units 51 to one another. Specifically, the elastic conductive member 63 is attached around the portion of the shaft member 62*a* of the long rivet 62, which is exposed between the adjacent movable electrode units 51, and both ends of the elastic conductive member 63 in the lateral direction (Y-axis direction) are in contact with respective side faces of the sliding-plate combining bodies 55 of the movable electrode units 51 which are located on both sides of the elastic conductive member.

The elastic conductive member 63 may be made of any type of conductive material that can expand and contract in the lateral direction (Y-axis direction), including for example, foam metal, metallic coil spring, metallic mesh, and conductive rubber. The elastic conductive member 63 may be formed by inserting the shaft member 62*a* into a through hole of a previously-produced tubular member, or by wrapping a long flexible plate-like member around the shaft member 62*a*. As described above, by attaching the elastic conductive member 63 capable of expanding and contracting in the lateral direction to the exposed portion of the shaft member 62*a* of the long rivet 62 between the adjacent movable electrode units 51, even when each movable electrode unit 51 moves in the lateral direction to change the size of the gap 57 between the adjacent movable electrode units 51, electric continuity between the adjacent movable electrode units 51 can be reliably maintained Since the other configurations, operations, and effects are the same as those in the first embodiment, the description thereof is omitted.

As described above, in this embodiment, the elastic conductive member 63, which can expand and contract in the plate thickness direction of the guide plates 154 and bring the adjacent movable electrode units 51 into conduction, is disposed between the adjacent movable electrode units 51. Therefore, even when each of the movable electrode units 51 moves in the lateral direction, electric continuity between the adjacent movable electrode units 51 can be reliably maintained Next, a fourth embodiment will be described. It should be noted that elements having the same structure as those of the first through third embodiments are denoted by the same reference numerals, and descriptions thereof are omitted. Furthermore, likewise, descriptions will be omitted for operations and effects that are the same as those of the aforementioned first through third embodiments.

Figure 9:
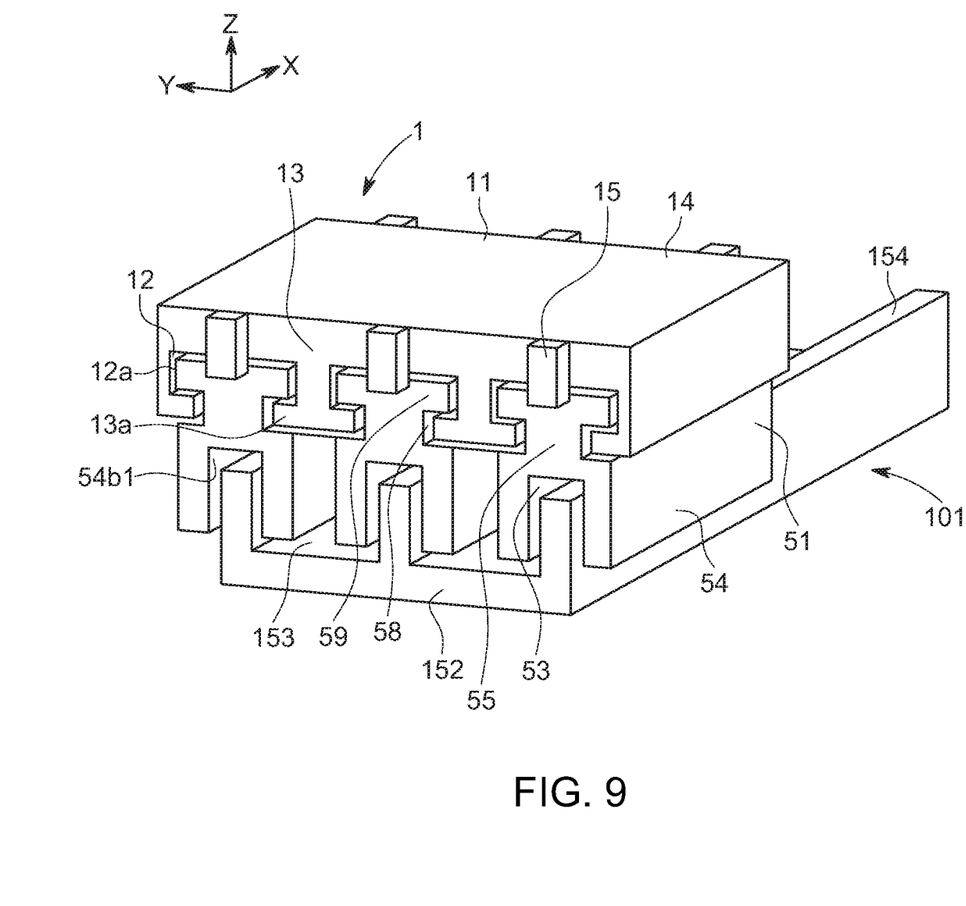
FIG. 9 is a perspective view of a contactless power feeding apparatus in accordance with a fourth embodiment.

FIG. 9 is a perspective view of a contactless power feeding apparatus in accordance with a fourth embodiment.

Note, since a rail 101 in this embodiment is the same as the rail 101 in the first to third embodiments, a description thereof is omitted.

In this embodiment, like the second and third embodiments, in each of the movable electrode units 51 included in the trolley 1, the spacer member 52 and the upper portions of the sliding plates 54 on both sides of the spacer member 52 are integrated into the sliding-plate combining body 55, but unlike the second and third embodiments, the movable electrode units 51 are connected to one another using a connecting block 11 in place of the long rivet 62. That is, in this embodiment, the connecting block 11 is used as the unit connecting member rather than the long rivet 62.

The connecting block 11 includes a rectangular flat plate-like top plate 14 extending in the longitudinal direction (X-axis direction) and the lateral direction (Y-axis direction), and a plurality of band plate-like unit holding plates 13 that perpendicularly extend from the lower face of the top plate 14 downward (Z-axis negative direction) and linearly extend in the longitudinal direction. The unit holding plates 13 are members for holding the sliding-plate combining body 55 of each movable electrode unit 51 from both sides, and a plurality of unit holding plates 13 (four in the illustrated view) is disposed with a quantity that is one more than the number of movable electrode units 51 (three in the illustrated example). A holding projection 13*a* protrudes from the lower end of the unit holding plate 13 in the lateral direction. The holding projection 13*a* protrudes from the lower end of the unit holding plate 13 located between adjacent movable electrode units 51 to both sides in the lateral direction, and protrudes from the lower ends of the unit holding plates 13 extending from both ends of the top plate 14 in the lateral direction to only one side in the lateral direction. A holding groove 12 extending in the longitudinal direction is formed between the adjacent unit holding plates 13. Upper portions of the holding projections 13a on both sides in the lateral direction in the holding groove 12 constitute holding recesses 12a. The connecting block 11 is preferably an integral member made of a conductive material such as metal.

In this embodiment, groove-like held recesses 58 extending in the longitudinal direction are formed on both side faces of the sliding-plate combining body 55 of the movable electrode unit 51. Upper portions of the held recesses 58 on the both side faces of the sliding-plate combining body 55 in the lateral direction constitute held projections 59.

Each movable electrode unit 51 is held by the connecting block 11 by inserting the sliding-plate combining body 55 into the corresponding holding groove 12. Specifically, the held projections 59 of the sliding-plate combining body 55 enter into the holding recesses 12a of the holding groove 12, and the holding projections 13a of the unit holding plates 13 enter into the held recesses 58 of the sliding-plate combining body 55. Since the dimensions of each portion of the holding groove 12 in the lateral direction are set to be larger than the dimensions of the corresponding portion of the sliding-plate combining body 55 in the lateral direction, and preferably, the electrode gap d, each movable electrode unit 51 is loosely fitted into the holding groove 12 and is freely movable in the lateral direction. The sliding-plate combining body 55 is stored in the corresponding holding groove 12 and then, downwardly-extending stoppers 15 are attached to front and rear end faces of the top plate 14 at positions corresponding to the holding grooves 12. The portions in the vicinity of the lower ends of the stoppers 15 engage with the front and rear end faces of the sliding-plate combining body 55, thereby preventing the sliding-plate combining body 55 from escaping from the holding groove 12. Through this, the trolley 1 can be obtained.

Note, since the other configurations, operations, and effects are the same as those in the first to third embodiments, a description thereof is omitted.

As described above, in this embodiment, the trolley 1 includes the connecting block 11 in which the plurality of holding grooves 12 disposed in parallel in the plate thickness direction of the guide plate 154 are formed, and each of the plurality of movable electrode units 51 is movably fitted into the respective holding groove 12 and held. Accordingly, the trolley 1 can be easily produced with high precision.

Note that the present disclosure is only one example, and any appropriate changes that preserve the gist of the present disclosure and can easily be conceived by a person skilled in the art are within the scope of the present disclosure. The widths, thicknesses, and shapes of the portions illustrated in the drawings are schematically illustrated and not intended to limit the interpretation of the present disclosure.

Moreover, the disclosure of the present specification describes characteristics related to preferred and exemplary embodiments. Various other embodiments, modifications and variations within the scope and spirit of the claims appended hereto could naturally be conceived by persons skilled in the art by summarizing the disclosures of the present specification.

The invention claimed is:

1. A contactless power feeding apparatus comprising:
a fixed electrode device; and
a movable electrode device that is movable with respect to the fixed electrode device, the fixed electrode device and the movable electrode device being capable of exchanging electric power through electric field coupling,
wherein the fixed electrode device includes at least one fixed electrode plate extending in a longitudinal direction, the movable electrode device is movable along the fixed electrode plate in the longitudinal direction, and includes at least one movable electrode unit, the movable electrode unit being movable in a plate thickness direction of the fixed electrode plate, and the movable electrode unit includes a pair of movable electrode plates opposed to both side faces of the fixed electrode plate, and a spacer member that maintains a constant distance between the pair of movable electrode plates, and causes conduction between the pair of movable electrode plates.

2. The contactless power feeding apparatus according to claim 1, wherein at least both side faces of the fixed electrode plate are coated with a coating film made of a dielectric.

3. The contactless power feeding apparatus according to claim 1, wherein the spacer member and the pair of movable electrode plates are integrated into a single member.

4. The contactless power feeding apparatus according to claim 1, wherein the fixed electrode device includes a plurality of the fixed electrode plates disposed in parallel to each other and in parallel in the plate thickness direction thereof, the movable electrode device includes a plurality of the movable electrode units disposed in parallel in the plate thickness direction of the fixed electrode plates, and the movable electrode units are independently movable in the plate thickness direction of the fixed electrode plates.

5. The contactless power feeding apparatus according to claim 4, wherein an elastic conductive member is disposed between the adjacent movable electrode units, the elastic conductive member being capable of expanding and contracting in the plate thickness direction of the fixed electrode plates and bringing the adjacent movable electrode units into conduction.

6. The contactless power feeding apparatus according to claim 4, wherein each of the plurality of the movable electrode units is movably fitted to a unit connecting member extending in the plate thickness direction of the fixed electrode plates.

7. The contactless power feeding apparatus according to claim 4, wherein the movable electrode device includes a connecting block having a plurality of holding grooves disposed in parallel in the plate thickness direction of the fixed electrode plates, and the plurality of the movable electrode units are movably fitted to the respective holding grooves and held in the respective holding grooves.

* * * * *